May 29, 1962

E. F. KOHL

3,036,672

PANELS AND THE PROCESS OF PREPARING SAME

Filed April 28, 1958

INVENTOR.
EVERARD F. KOHL
BY John Mahoney
Attorney

May 29, 1962  E. F. KOHL  3,036,672
PANELS AND THE PROCESS OF PREPARING SAME
Filed April 28, 1958
6 Sheets-Sheet 2

INVENTOR.
EVERARD F. KOHL
BY John Mahoney
Attorney

May 29, 1962

E. F. KOHL 3,036,672

PANELS AND THE PROCESS OF PREPARING SAME

Filed April 28, 1958

INVENTOR.
EVERARD F. KOHL
BY John Mahoney
Attorney

May 29, 1962 E. F. KOHL 3,036,672
PANELS AND THE PROCESS OF PREPARING SAME
Filed April 28, 1958
6 Sheets-Sheet 6

INVENTOR.
EVERARD F. KOHL
BY John Mahoney
Attorney

# United States Patent Office 3,036,672
Patented May 29, 1962

3,036,672
PANELS AND THE PROCESS OF
PREPARING SAME
Everard F. Kohl, Lakewood, Ohio
(12210 Triskett Road NW., Cleveland 11, Ohio)
Filed Apr. 28, 1958, Ser. No. 731,489
8 Claims. (Cl. 189—34)

The present invention relates to panels and more particularly to panels of the sandwich type for use in the construction of walls, floors, ceilings, partitions, and doors of building structures or in accessories or appliances, such as sinks, bars, table tops, or the like. It also relates to an improved process of preparing such panels.

In preparing metal panels of the sandwich type for use in buildings or other structures, it has heretofore been the practice to provide a core material in the form of a reticulated or honeycomb structure and to braze or weld outer metal plates or skins to the core material. The brazing or welding of the outer plates or skins to the core material, however, is not only difficult but is expensive. Another serious objection to such method is that it is impractical to apply a finishing material, such as decorative metal or a plastic material, to the outer faces of the plates or skins prior to assembly because such material is adversely affected during the welding or brazing operation.

It has also been proposed to adhesively unite the outer plates or skins to the core material. Adhesives which have been found practical, however, are not only expensive but they soften or melt at comparatively low temperatures and consequently architects have been hesitant in specifying such panels for use in fire-proof building structures.

It is an object of the present invention to provide an improved panel for use in building structures or in accessories or appliances, such as bars, tables, or the like, in which the skins or outer plates of the sandwich structure are mechanically bonded to the core material to provide a strong structure.

Another object of my invention is to provide an improved process of preparing panels of the sandwich type having a metal core material and outer metal skins or plates by means of which the outer skins or plates may be mechanically bonded in an economical manner to metal core material to provide a strong structure.

Another object of the invention is to provide an improved metal panel of the sandwich type and to an improved process of preparing the same in which a core material which is harder than the metal forming the outer skins or plates is mechanically bonded to the skins or plates.

A further object of the invention is to provide an improved metal panel of the sandwich type and to an improved process of preparing the same in which the core metal is formed of the same metal or of a metal which is harder or softer than the metal forming the outer skins or plates and is mechanically bonded to the outer skins or plates.

Another object of the invention is to provide an improved fastening unit that is particularly adapted for uniting skins or plates to a core material to provide an improved sandwich construction.

A still further object of my invention is to provide an improved process of preparing panels of the sandwich type having spaced outer skins or plates and a core metal mechanically bonded thereto to provide a strong structure and in which the outer face of one or both of the skins or plates is provided with a finishing material, such as a layer of decorative metal or a layer of plastic material which may be bonded or adhesively secured to the outer face of one or both of the plates or skins prior to the bonding of the metal plates to the core material.

My invention will be better understood by reference to the accompanying drawings in which:

FIG. 15 is an enlarged detail perspective view of a portion of the sheet of metal shown in FIG. 14;

FIG. 18 is a detail cross sectional view with parts broken away of one of the fastening units shown in FIG. 25;

In accordance with the present invention, panels of the sandwich type are provided in which the outer plates or skins are mechanically bonded to the core material or in which the outer plates or skins are each bonded to a separate fastening unit arranged between the core material and the inner faces of the plates or skins. Various means may be utilized to effect this bond as will be more particularly described as the specification proceeds.

One form of my invention is shown in FIGS. 1 to 4 of the drawings in which the panel includes spaced outer metal plates or skins 1 and 2 separated by and mechanically bonded to a hollow metal core material consisting of a plurality of substantially tubular members 3 which may be of any suitable arcuate shape, such as circular or oval in cross section. As shown in the drawings, the metal tubes are cylindrical in shape and each tube has outer end portions which are bevelled or inclined inwardly toward its axis as indicated by the numerals 4 and 5 in FIG. 3 of the drawings and extend into oppositely disposed indentations 6 and 7, respectively, in the inner faces of metal plates 1 and 2 and the free end portions of each tube are curled as indicated by the numerals 8 and 9 against the edge portions of the respective plates which border the indentations to provide a strong mechanical bond between the outer plates and the core material.

The number of tubular members which are utilized in forming the panel must be sufficient to provide a strong rigid structure and while in the drawings they are shown spaced from each other, it will be understood that they may be arranged in contiguous relation or as in the case of wall panels in which the lower portion of the panel may be subjected to greater strains than the upper portion, the tubular cores may be arranged in contiguous relation to each other at the lower portion of the panel and may be arranged in spaced relation to each other at the upper portion of the panel.

Figure 1:
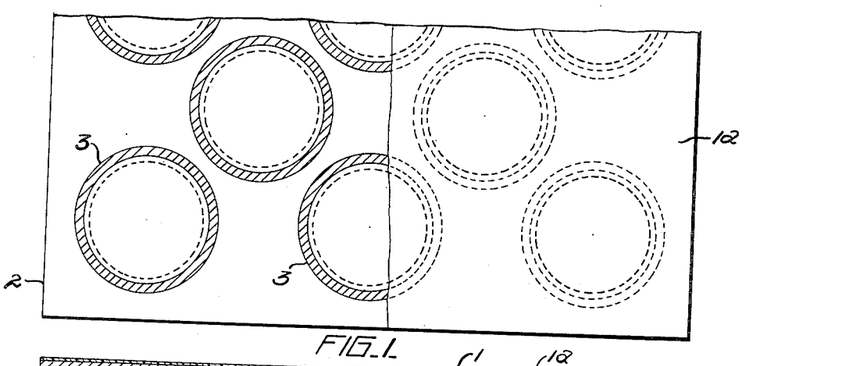
FIG. 1 is a plan view of one form of my improved panel with parts broken away and parts shown in section.
Figure 2:
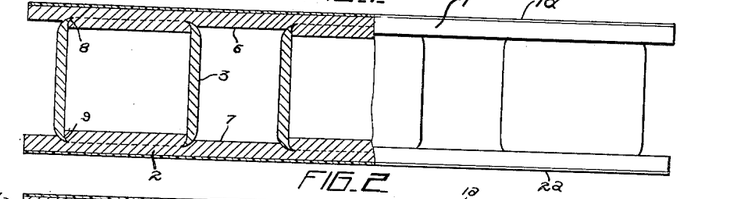
FIG. 2 is a view partly in elevation and partly in section of the panel shown in FIG. 1.
Figure 3:
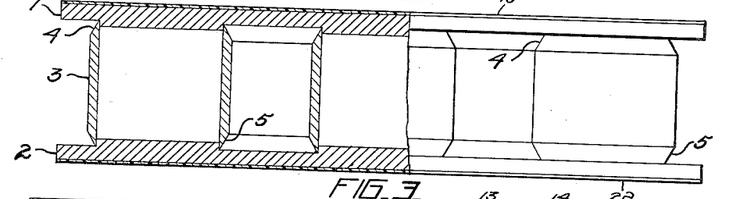
FIG. 3 is a view partly in elevation and partly in section of an assembly consisting of the outer metal plates or skins and the core after the plates or skins have been subjected to an etching liquid.
Figure 4:
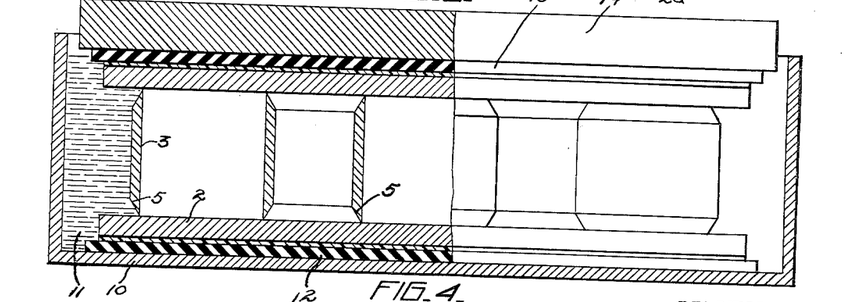
FIG. 4 is a cross sectional view of a tank showing an assembly partly in elevation and partly in section for providing a temporary bond between the outer plates or skins and the core material during etching with only a portion of the etching liquid being shown.
Figure 5:
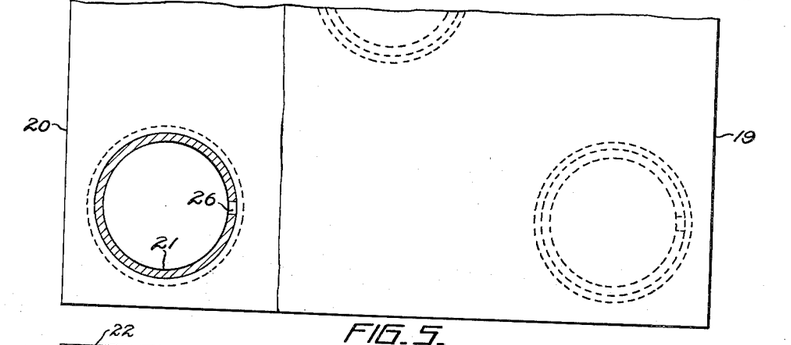
FIG. 5 is a view partly in plan with portions of the upper plate or skin broken away and showing one of the core members in section.

Because my improved method of preparing a mechanical bond between the core material and the outer skins or plates does not require brazing or welding, a finishing material, such as a layer of plastic material as indicated by the numerals 1a and 2a in FIGS. 2 to 4 of the drawings may be bonded to the outer face of one or both of the metal plates or skins 1 and 2 prior to the bonding operation. This is advantageous because under such conditions, the finishing material may be applied to the outer face of one or both of the plates at the fractory under controlled conditions. The finishing material, however, does not constitute an essential element of the panel or of the process of preparing it and if desired may be omitted.

While I do not desire to be limited to the manner in which the indentations are formed in the inner faces of the skins or plates, one method is illustrated in FIGS. 3 and 4 of the drawings. As shown in FIG. 4, a tank 10 is provided which contains a suitable etching liquid 11 for the inner faces of the skins or plates. The skins or plates may be formed of any suitable metal, such as steel, copper, aluminum or brass, and the tubular cores may be formed of the same metal or of a metal different than that of the skins or plates. When the core is formed of the same metal as the plates, however, it is necessary to plate the core with a metal that is inert to the etching liquid or to otherwise protect it to prevent the liquid of the etching bath from etching the core metal. For instance, if the outer skins or plates are formed of aluminum, a suitable etching liquid may be a solution of sodium hydroxide or a solution consisting of approximately five parts by volume of 72% perchloric acid and 95 parts by volume of glacial acetic acid, in which case the cores may be formed of copper or brass, or if the core material is also formed of aluminum, the tubes constituting the core metal may be plated with a metal that is inert to the etching liquid, such as copper, or may be coated with a thin film of a resin, such as a vinylite resin, which may be applied to the core material from any desired solution, such as from a mixture of cyclohexanone and acetone.

When the plates or skins are formed of a mild carbon steel, the etching bath may consist of chromic acid, sulphuric acid, and water, in the proportion of approximately 5 pounds per gallon of chromic acid, 2⅛ pounds per gallon of sulphuric acid, and the balance water. Etching solutions for other types of steel are fully disclosed on page 99 of the January 3, 1955, issue of the American Machinist. When the plates or skins are formed of brass, the etching bath may consist of a mixture of 1 part by volume of ferric chloride, 10 parts by volume of concentrated hydrochloric acid, and 113 parts by volume of water. Other etching solutions for brass are disclosed in the March 1954 issue of the Journal of the Electrochemical Society, pages 124 to 127, and it will of course be understood that if the metal plates are formed of brass or steel, the core metal must be formed of or plated with a metal that is inert to the etching bath or it may be provided with a thin coating of a resin in the same manner as when aluminum plates and cores are utilized.

To protect the outer faces of the plates or skins or the finishing material from attack by the etching liquid, a sheet composed of rubber or other plastic material 12 having a greater area than the lower skin or plate 2 is first placed on the bottom of the tank. The lower skin or plate 2 is then placed on the layer of plastic material 12 and the core members are arranged with their lower bevelled end portions 5 engaging the lower plate or skin 2 as shown in FIG. 4. The upper plate or skin 1 is next placed upon the core members and to protect the outer face of the upper plate or the finishing material 1a from the etching liquid, an additional layer of rubber or other plastic material 13 of substantially the same size as the lower layer 12 is placed over the upper plate and to force the plates toward each other to form a temporary unitary structure between the plates and the core material while indentations are being etched in the inner faces of the plates, a weight 14 is placed upon the upper face of the plastic material.

A suitable etching liquid 11 for the inner faces of the outer plates or skins, only a portion of which is shown, may be introduced into the tank either prior to or after the panel members and the protecting layers have been assembled in the tank. As illustrated in FIG. 4 of the drawings, the etching liquid 11 in the tank is at sufficient level to be disposed around the cores and the inner faces of the skins or plates and is held in contact with the plates or skins for sufficient time to form indentations 6 and 7 in the inner faces of the metal plates 1 and 2 between the tubular members. The weight 14 and the upper plastic or rubber layer 13 and the unitary structure consisting of the upper and lower plates and the core members are then removed from the tank, or if desired, the etching liquid may be first drained from the tank prior to the removal of the assembled panel.

Figures 11, 12, 13, 14, 16, 17:
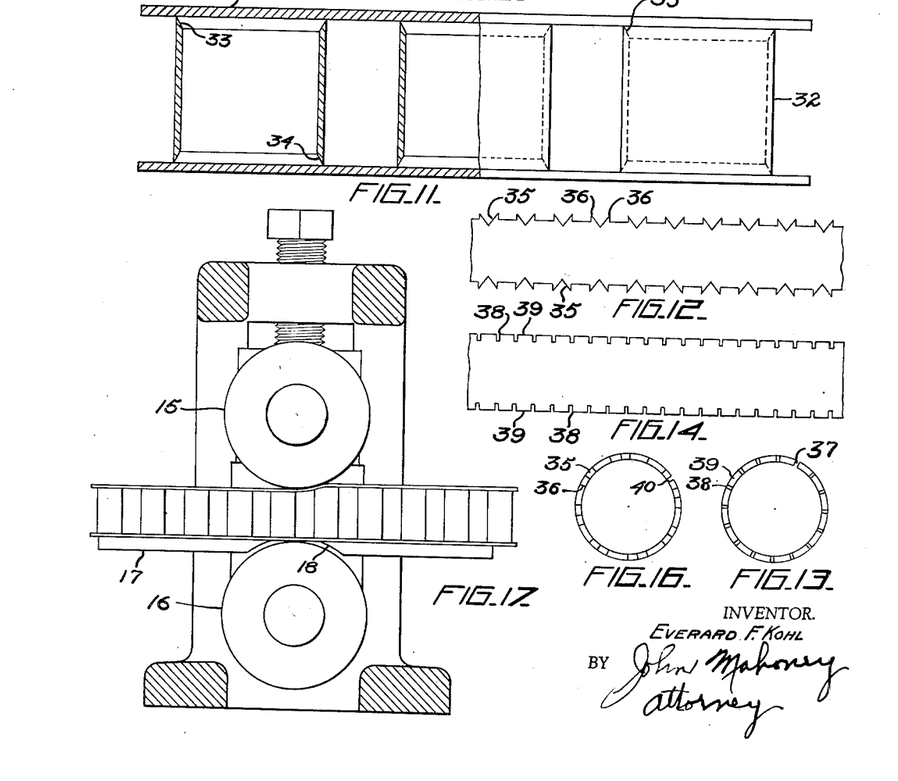
FIG. 11 is a side elevational view with parts in section of the panel members shown in FIGS. 9 and 10 assembled in place prior to the pressing operation.
FIG. 12 is a reduced side elevational view of a sheet of metal which may be utilized as a core strip or which may be bent into a substantially tubular shape to form a tubular core member.
FIG. 13 is an end view of the core material shown in FIG. 14 after the core material is bent into a substantially tubular shape.
FIG. 14 is a side elevational view of another sheet of metal which may be utilized as a core strip or which may be bent into a substantially tubular shape to form a core member.
FIG. 16 is an end view of the core material shown in FIG. 12 after it has been bent into a substantially tubular shape to form a core member.
FIG. 17 is an elevational view of a press for forming a mechanical bond between the skins or plates and the core material.

Pressure is then applied to the outer faces of the plates or skins 1 and 2, or to the outer faces of the finishing material, if a finishing material is present, to curl the bevelled edges of the core members against the edges of the plates which border the indentations in the plates as shown in FIG. 2, thus forming a strong mechanical bond between the outer skins or plates and the core metal. Any suitable means may be provided for this purpose, such as a hydraulic press, or as shown in FIG. 17, a pair of rollers 15 and 16 may be provided between which the panel may be passed. As shown in FIG. 17, the panel is placed on a base plate 17 having an arcuate-shaped groove 18 to receive the upper portion of the roller 16 and as the panel consisting of the outer skins or plates 1 and 2 and the core members 3, is passed between the rollers, the bevelled end portions of the core members are curled inwardly against the edges of the plates bordering the indentations to provide the finished panel. The rollers of the press are of course adjustable to permit panel assemblies of varying thickness to enter between the rollers.

The outer plates 1 and 2, if not finished prior to assembly, may be given the desired finish and if the panels are to be utilized in accessories or appliances, they may be provided on one or both sides with a layer of plastic material which may be bonded or secured thereto in any suitable manner, such as by an adhesive. It will of course be understood that after the panel is completed insulating material may be blown around the core members between the panels.

Figure 6:
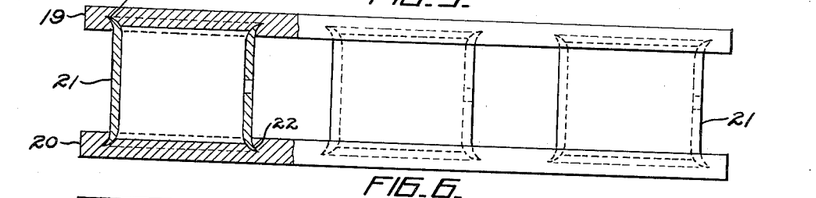
FIG. 6 is a side elevational view of the panel shown in FIG. 5 with parts in section to show the mechanical bond between the core metal and the outer plates or skins.

Another modification of my invention is illustrated in FIGS. 5 to 8 of the drawings. As shown in FIG. 6, the panel consists of upper and lower plates or skins 19 and 20 between which is interposed metal core material consisting of a plurality of tubular members 21, the outer edges of each of which are bevelled outwardly relative to its axis and are curled inwardly against the respective edges of the plates which border the oppositely disposed indentations which are formed in the plates during etching to provide a strong mechanical bond between the outer skins or plates and the core metal, as indicated by the numerals 22.

Figure 7:
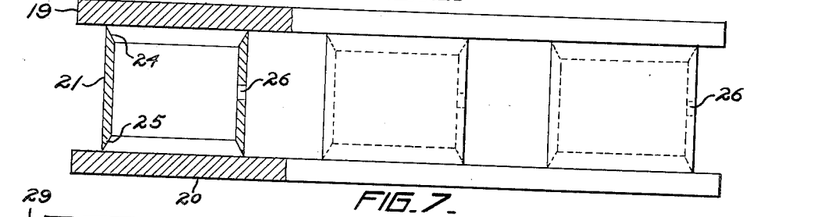
FIG. 7 is an elevational view with parts in section of an assembly for preparing the panel shown in FIGS. 5 and 6.

In preparing the panel disclosed in FIG. 6, the tubular core members are disposed upon the lower skin or plate 20 and the upper plate 19 is then supported on the tubular core members as shown in FIG. 7. In this modification, each end portion of the tubular members is provided with an outwardly inclined or bevelled face as indicated by the numerals 24 and 25 and each tube is provided substantially midway between its ends with an aperture 26. The assembly consisting of the upper and lower plates and the tubular core members is then placed in a tank containing an etching liquid, such as that shown in FIG. 4, in which the etching liquid is maintained at such level that it will flow into the tubular core members through apertures 26 to substantially the level indicated by the numeral 27 in FIG. 8.

Figure 8:
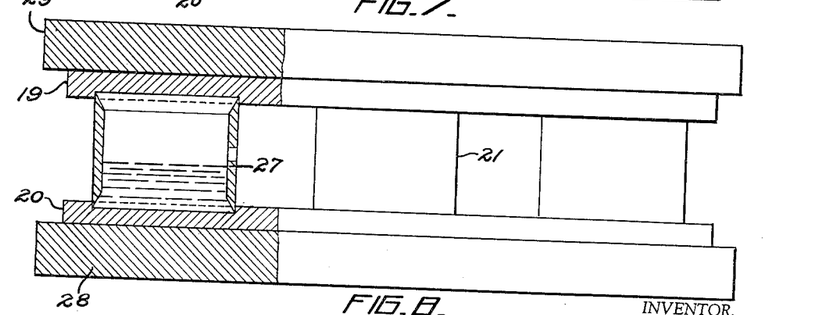
FIG. 8 is an elevational view with parts in section of an assembly showing another method of etching portions of the inner faces of the outer plates or skins.

The assembly consisting of the outer skins or plates 19 and 20 and the core members with the etching liquid therein is then removed from the tank and is placed upon a plate 28 which may be heated in any desired manner, such as by means of an electrical current. When the assembly is in the position shown in FIG. 8 of the drawing, the liquid etches those portions of plate 20 which are in contact with the etching liquid and a weight 29 placed upon the upper plate 19 forces the tubular members downwardly into the indentations which are formed by the etching liquid as shown in FIG. 8 of the drawings. The assembly consisting of the inner and outer skins or plates 19 and 20 and the metal core members is then inverted to place the outer skin or plate 19 upon the heating plate 28 in which case the weight 29 is placed upon plate 20. The etching liquid then etches the inner portions of plate 19 which are in contact with the etching liquid and the weight 29 forces the opposite ends of the metal cores into the indentations formed by the etching liquid as shown in FIG. 8.

The nature of the etching liquid that is utilized and the temperature to which it is heated will of course depend upon the composition of plates 19 and 20 and with certain etching liquids the heating plate will not be necessary while in other cases, it is only necessary to heat the etching liquid to a temperature substantially above normal temperature, such as to a temperature of approximately 150° to 180° Fahrenheit. In this modification, it will of course be understood that the metal forming the core material must be of a composition that is not attacked by the etching liquid or if it is formed of such a metal, it must be plated with a metal or coated with a composition, such as a resin which is not attacked by the etching liquid. Etching liquid for different metals have previously been mentioned and may of course be utilized in etching the inner faces of the plates or skins 19 and 20 within the tubes.

After a temporary bond has been provided between the outer plates or skins and the core material, weight 29 may be removed and the panel consisting of the outer plates or skins and the core metal may be moved endwise to a substantially vertical position at which time the etching liquid will flow from the core members through the apertures 26. The panel is then subjected to a pressing operation in a suitable press, such as a hydraulic press, or it may be passed between the rollers 15 and 16 as shown in FIG. 17 to curl the outer edges of the tubular core members against the edges of the plates bordering the indentations as indicated by the numeral 22 in FIG. 6 to provide a strong mechanical bond between the plates and the core members. Insulation may of course be blown around the tubular core members between the plates as in the modification shown in FIGS. 1 to 4 and because of the apertures in the tubular core members, it may also be blown within the tubular core members.

Figure 9:
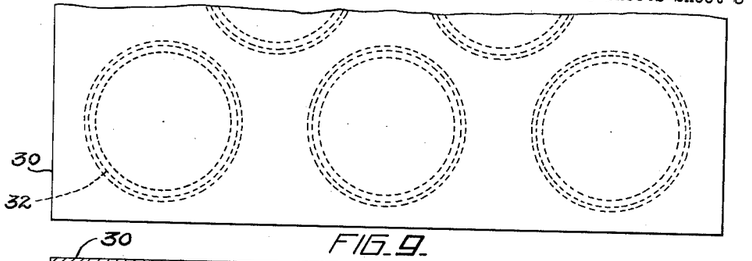
FIG. 9 is a plan view of another form of my improved panel.
Figure 10:
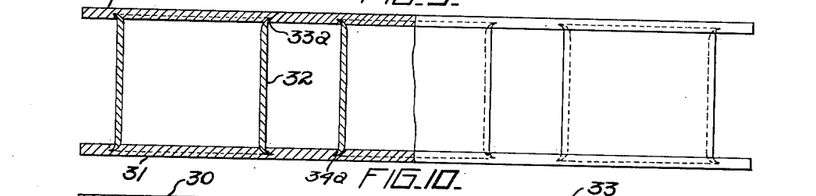
FIG. 10 is an elevational view with parts in section of the panel shown in FIG. 9.

While a good mechanical bond may be provided between the outer plates or skins and the core metal by the methods disclosed in FIGS. 1 to 8, I do not desire to be limited to such processes as I have found that a good mechanical bond may be provided between the plates or skins and core metal by mechanical means alone. One form of this method of bonding the outer plates or skins to the core metal is shown in FIGS. 9 to 11 of the drawings in which the outer plates or skins are designated by the numerals 30 and 31 and the tubular core members by the numeral 32. In the modification shown in FIGS. 9 to 11, it is necessary, however, that the tubular core members shall be formed of a metal that is harder than that of the plates or skins. For instance, the outer plates or skins 30 and 31 may be formed of a comparatively soft metal, such as aluminum, and the core members may be formed of a metal that is harder than aluminum, such as iron or steel, and while the tubular members may be formed of strips of metal bent into tubular form with their adjacent ends secured together by suitable means, such as welding, this is not essential because a small vertical space may be provided between the end portions of the metal as illustrated more particularly with respect to the modifications shown in FIGS. 12 to 16 which will be subsequently described. This eliminates the necessity of welding the end portions of the tubular members together and thus reduces the cost of preparing the panels.

As illustrated in FIGS. 9 to 11, the tubular core metal is round or substantially round and the outer end portions of each of the tubular members are bevelled outwardly as indicated by the numerals 33 and 34. The assembly as shown in FIG. 11 consisting of the tubular core members and the outer plates or skins is then placed in a press, such as a hydraulic press, or passed between rollers 15 and 16 as shown in FIG. 17 of the drawings to force the bevelled end portions of the tubular members into the outer plates or skins and during this process, the bevelled end portions of the core metal is curled within the metal plates as indicated by the numerals 33a and 34a in FIG. 10 to form a strong mechanical bond between the core members and the inner faces of the outer skins or plates 30 and 31.

Figures 26, 27, 31, 32, 33:
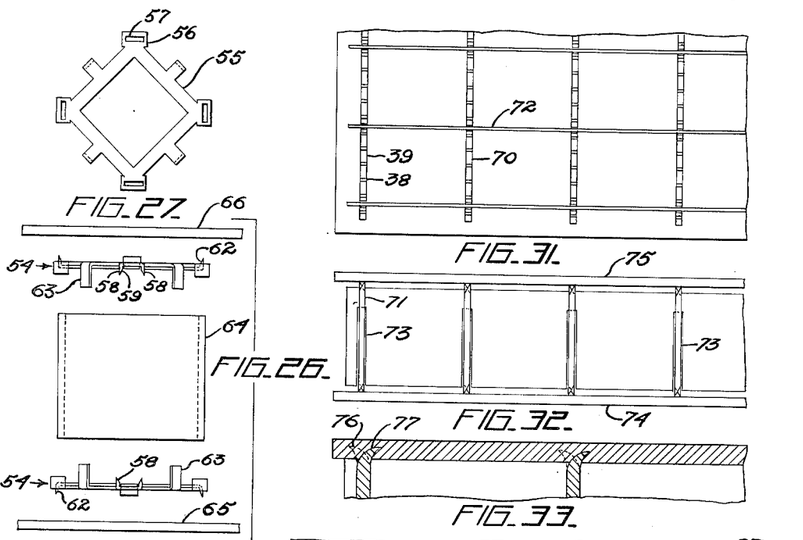
FIG. 26 is a view similar to FIG. 25 showing a modified form of fastening units prior to their assembly with the outer plates or skins.
FIGS. 27 and 28 are plan views of the outer and inner plates, respectively, of one of the fastening units shown in FIG. 26.
FIG. 31 is a view of another modification of my improved panel with the upper plate removed and showing a plan view of the core and supporting strips.
FIG. 32 is a side elevational view of the structure shown in FIG. 31 prior to the pressing operation.
FIG. 33 is a detail cross sectional view of one of the plates with parts broken away and a portion of the core strips of the panel shown in FIGS. 31 and 32 after the pressing operation.

Instead of forming the core metal with end portions which are bevelled outwardly as shown in FIG. 11, the core material may be bevelled inwardly as shown in FIGS. 1 to 4 in which case the bevelled edges are curled within the metal of the plates toward the axis of the respective tubes during the pressing operation. However, as illustrated in FIGS. 12 and 16, a core metal may be provided having projections at its outer edges which are bevelled in opposite directions relative to each other to provide a double bond between the projections on the core metal and the outer plates or skins. To provide this structure, a sheet of metal for forming a core member is shown in FIG. 12 which is provided with spaced V-shaped indentations 35 in its opposite edges, each of which defines the inner edges of pairs of spaced teeth or projections 36 which extend outwardly beyond the body of the metal. The inner edge of one of each pair of teeth is inclined in one direction and the inner face of the other tooth of each pair is inclined in the opposite direction. In forming the core members, sheets of metal as shown in FIG. 12 are bent into the form of a metal tube having open ends as indicated by the numeral 40 of the drawings. The metal of which the core members are formed is harder than the outer plates or skins and when the core members are interposed between the outer plates or skins and pressure is applied to the assembly, such as by means of a press or by passing the assembly between the rollers shown in FIG. 17, the teeth penetrate into the outer plates or skins and are curled in opposite directions within the plates to form a double bond between the skins and the core metal as shown in FIG. 33 which will be subsequently described.

A double bond between projections on the core members and the outer plates or skins may also be obtained in the structure illustrated in FIGS. 13, 14 and 15. As shown in FIG. 14, a sheet of metal which is harder than the outer plates or skins is provided with spaced notches 38 of substantially less width than the projections on each of the outer edges of the sheet to provide a series of projections 39 and as shown in FIG. 15, alternate projections on each edge of the sheet is bevelled in one direction and the remaining projections are bevelled in the opposite direction from the body portion of the core material to provide a series of closely arranged projections, each having a base portion formed integral with the body portion and outwardly tapering penetrating edge portions. The sheet of metal shown in FIG. 14 is then bent into an arcuate shape, preferably in the form of a tube with open ends which are in close proximity to each other to provide a slot 37, and when core members formed in this manner are interposed between outer plates or skins formed of a metal that is softer than the metal forming the core material and pressure is applied to the assembly, such as by means of a press or by passing the assembly between rollers as shown in FIG. 17, the projections penetrate into the plates or skins and alternate projections of the core members are curled inwardly in one direction and the remainder of the projections are curled in the opposite direction in substantially the manner shown in FIG. 33 to form a strong mechanical bond between the core members and the outer skins or plates.

I also provide means for mechanically bonding the metal core material to the outer skins or plates when the core material is formed of a metal which is the same as the metal forming the outer skins or plates or of a metal that is softer or harder than the metal forming the outer skins or plates.

Figures 19, 20, 21, 22, 23, 24, 25:
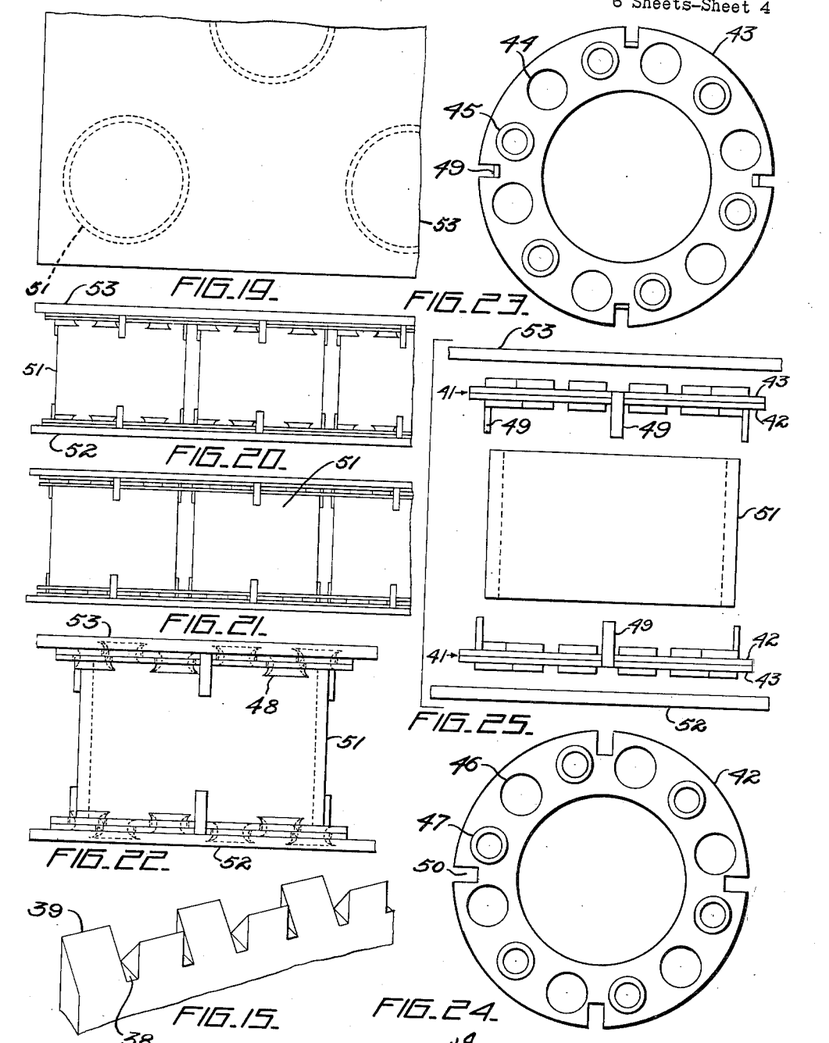
FIG. 19 is a plan view of another modification of my invention.
FIG. 20 is a side elevational view of the panel shown in FIG. 19.
FIG. 21 is an elevational view of the assembly prior to the pressing operation.
FIG. 22 is an enlarged elevational view of one of the cores and the panels after the pressing operation.
FIG. 23 is an enlarged plan view of one of the outer plates of a fastening unit utilized in bonding the panels to the core material.
FIG. 24 is an enlarged plan view of one of the inner plates of the fastening units.
FIG. 25 is an enlarged exploded view of the panel and one of the core elements shown in FIG. 19 prior to the assembly of the fastening units, with parts of the outer plates being shown broken away.

In preparing a sandwich construction of this type, separate fastening units are provided having projections extending outwardly toward the plates or skins and projections extending inwardly toward the metal forming the core. One form of this invention is illustrated in FIGS. 18 to 25 of the drawings in which the fastening units are designated generally by the numeral 41. As shown in FIGS. 18 and 25, each of the fastening units consists of inner and outer metal plates 42 and 43. The outer plate 43 of each of the fastening units is provided with spaced apertures 44 and inwardly extending annular projections 45 and in a like manner, the inner plate of each fastening unit is provided with spaced apertures 46 and outwardly extending annular projections 47 and when the plates of each fastening unit are assembled, the projections 45 on the outer plates extend through the respective apertures in the inner plates and the projections 47 on each of the inner plates extend through the respective apertures in the outer plate as shown more particularly in FIG. 18. The projections on both plates are bevelled as indicated by the numeral 48 to provide angularly-shaped edges. To facilitate assembly of the fastening units upon the outer edge portions of the core, the outer plate of each of the fastening units is provided with inwardly extending prongs or guides 49, each of which extends through a slot 50 in the inner plate and engages the outer face of a tubular core 51 which is also formed of metal. The ends of each of the cores 51 may be welded together to form a complete tube or they may be spaced a short distance from each other as shown in FIGS. 13 and 16.

In forming the panel, the fastening units are first assembled on a core 51 and a plurality of such assemblies are placed upon a lower plate or skin 52 and an upper plate or skin 53 is placed over the projections 47 extending from the upper fastening unit as illustrated in FIG. 21 of the drawings. Pressure is then applied to the assembly consisting of the outer plates or skins, the fastening units, and the cores, by means of a press or by passing the assembly between a pair of rollers as shown in FIG. 17 and the outwardly bevelled projections 47 on the inner plate of each of the fastening units are forced into the metal plates 52 and 53, respectively, and are curled within the inner faces of the outer plates or skins to provide a strong mechanical bond between the fastening units and the outer skins or plates and the bevelled projections 45 extending from the outer plate of each of the fastening units are forced into and are curled within the opposite end portions of the tubular core members to provide a strong mechanical bond between the fastening units and the core metal as shown more particularly in FIG. 22.

It will be apparent that when a fastening unit is interposed between each of the core members and the outer skins or plates of the panel as disclosed in FIG. 25 of the drawings, the core and the outer plates may be formed of the same metal, such as aluminum, in which case the metal plates forming the fastening units are each composed of a metal that is harder than aluminum. The core members, however, may be formed of a metal that is harder or softer than the metal forming the outer skins or plates and it is only necessary that the metal forming the outer plates of the fastening units shall be harder than the metal of which the core members are formed and the metal of which the inner plates of the fastening units is formed shall be harder than the metal forming the outer skins or plates. For instance, if the outer plates or skins of the panel are formed of aluminum and the inner cores are formed of a metal that is harder than aluminum, such as iron, the inner plate of each of the fastening units may be formed of a metal, such as iron, and the outer plate of each of the fastening units may be formed of a metal that is harder than iron, such as stainless steel.

It will of course be understood that I do not desire to be limited to the shape of the members which form the fastening units, the manner in which they are connected together, or to the shape of the projections extending inwardly and outwardly from the fastening units. To provide an economical structure, however, it is desirable that the projections upon at least one of the members shall extend through suitable apertures or slots in the other member and that the projections extending from both members shall be provided with bevelled edges so that the projections on the inner member of each of the fastening units may be forced into the inner faces of the outer plates or skins of the panel and curled within the metal forming the plates and that the projections on the outer member of each fastening unit may be forced into the metal forming the core and curled within the metal forming the core during the pressing operation.

To illustrate this particular phase of my invention, another form of this type of my invention is shown in FIGS. 26 to 29 in which each of the fastening units is designated generally by the numeral 54 and consists of inner and outer members. As shown in the drawings the outer member 55 of each fastening unit is provided with portions 56 which extend outwardly from a central opening, each of which portions is provided with a substantially rectangularly-shaped opening 57 and portions adjacent to each opening are bent inwardly to form spaced flanges 58 as shown in FIG. 26, each of which flanges terminates in a bevelled free edge portion as indicated by the numeral 59 and the inner member 60 is provided with flanges 61, each of which extends through a respective opening 57 in the outer member and terminates in a bevelled free end portion 62. To facilitate assembly of the fastening units upon the opposite edge portions of the core metal, the outer plate is also provided with guide strips 63 which in this modification extend inwardly and engage the inner faces of the tubular metal cores 64 and while the core members are shown as being round, it is not essential that the opposite ends of the tubes shall be completely closed.

As in the modification shown in FIG. 18 and FIGS. 19 to 25, the members of each of the fastening units are interconnected and a fastening unit is assembled on each end portion of each of the tubular cores with the guide strips 63 of each fastening unit engaging the inner faces of the tubular core 64 to which it is applied.

The fastening units disclosed in FIGS. 26 to 29 are utilized to provide a strong mechanical bond between the core members and the outer plates or skins of the panels in the same manner as in the modification shown in FIGS. 19 to 25, that is a plurality of the core members with the fastening units assembled upon the opposite ends of each tubular core member are placed upon a lower plate 65 with the projections on the inner members of the lower fastening units resting upon the lower plate and an upper plate 66 is placed upon the outwardly extending projections of the inner members of the upper fastening units, and the assembly is subjected to pressure in a suitable press or by passing the assembly between rollers as shown in FIG. 17 to force projections 61 of the inner plate of each fastening unit into the outer plates or skins of the panel and to curl the edges of the projections inwardly within the metal to provide a strong mechanical bond between the flanges on the inner members of the fastening units and the plates and to force the inwardly extending projections 58 of the outer member of each fastening unit into the core metal and to curl them within the end portions of the core metal to provide a strong mechanical bond between the outer skins or plates and the core members.

In the modification shown in FIGS. 26 to 29, it will also be apparent that it is only necessary that the projections on the outer member of each fastening unit shall be formed of a metal that is harder than the core metal and that the projections on the inner member of each fastening unit shall be formed of a metal that is harder than the metal forming the outer plates or skins of the panel and consequently the outer plates and the core members may be formed of the same metal or the outer plates or skins of the panel may be formed of a metal that is softer or harder than the metal forming the core members. It will also be noted that in this modification, the projections 61 which extend into the outer plates or skins of the panel may be of sufficient width to maintain the core members in spaced relation to the outer plates or skins to minimize thermal conduction between the plates and the metal forming the cores.

To obtain a strong bond between the outer skins or plates and the core metal, however, it is not essential that the core members shall be round. For instance, the core members may be bent into an undulating or wave shape, such as a substantially sinuous shape as indicated by the numeral 67 in FIG. 30. In this modification of my invention, the outer edges of each of the strips may consist of projections, such as spaced pairs of teeth 36 as shown in FIG. 12 or the outer edges of the strips may be of the form shown in FIGS. 14 and 15 in which alternate projections or teeth on the strips are bevelled in one direction and the remainder of the teeth or projections are bevelled in the opposite direction.

Figures 29, 30, 35, 36:
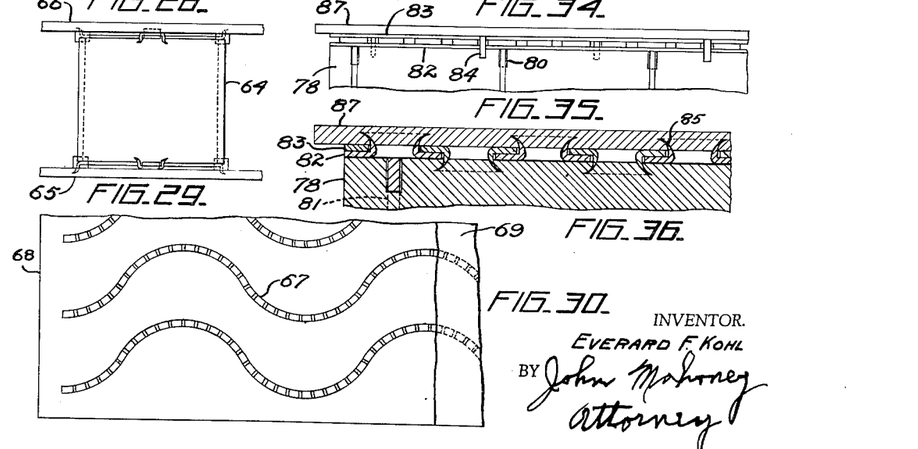
FIG. 29 is an elevational view of the panel unit shown in FIG. 26 after the final pressing operation.
FIG. 30 is a fragmentary view of another form of my improved panel showing a plan view of portions of the core and the upper plate.
FIG. 35 is a side elevational view with parts broken away of the panel shown in FIG. 34 prior to the pressing operation.
FIG. 36 is a detail cross sectional view of a portion of the panel shown in FIGS. 34 and 35 after the pressing operation.
Figure 37:
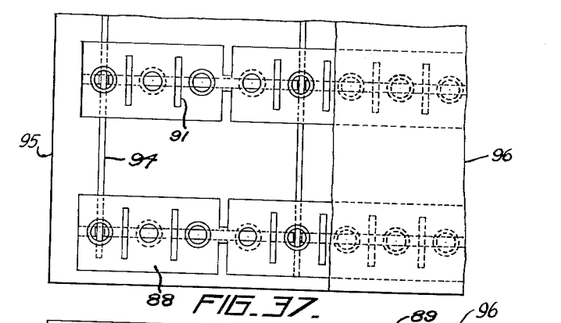
FIG. 37 is a plan view of a portion of another form of my improved panel with the upper plate broken away to show a plan view of one of the fastening units.
Figure 38:
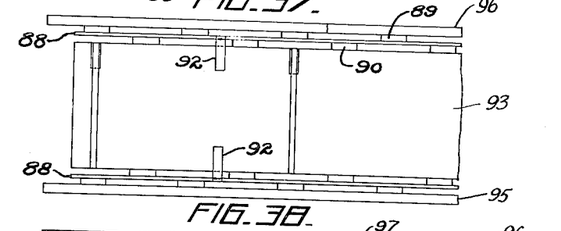
FIG. 38 is an elevational view with parts broken away of the panel shown in FIG. 37 prior to the pressing operation.
Figure 39:
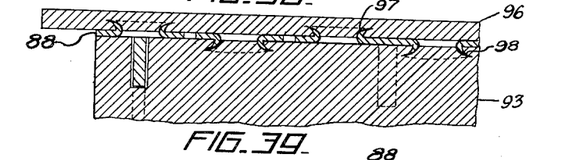
FIG. 39 is a detail cross sectional view of a portion of the panel elements shown in FIGS. 37 and 38 after the pressing operation.
Figure 40:
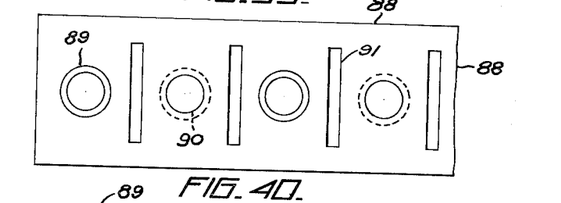
FIG. 40 is a plan view of one of the fastening units shown in FIGS. 37 to 39.
Figure 41:
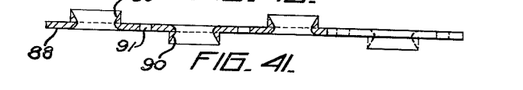
FIG. 41 is a view partly in elevation and partly in section of the fastening unit shown in FIG. 40.

As shown in FIG. 30, the sinuous-shaped strips 67 have edge portions similar to that shown in FIGS. 14 and 15 and during asembly, the strips are placed upon a lower plate or skin 68 with their lower projections 39 engaging the lower plate or skin and an upper plate or skin 69 is then placed over the projections 39 extending from the upper edge of the strips. The panel is then subjected to pressure in a suitable press or is passed between rollers as shown in FIG. 17 to force the upper projections of the strips into the inner face of the upper plate or skin and to curl the projections in opposite directions within the plate as shown more particularly in FIG. 33 to provide a strong mechanical bond between the strips and the upper plate or skin and in a like manner the lower projections are forced into the inner face of the lower plate or skin and are curled within the lower plate to form a strong mechanical bond between the strips and the lower plate, as illustrated more particularly in FIG. 33.

Instead of bending the strips into a sinuous shape as shown in FIG. 30, the strips may be straight or substantially straight in which case it is necessary to provide means to support the core strips in place during assembly. This form of the invention is shown in FIGS. 31 and 32 of the drawings in which a plurality of core strips 70 are provided, the upper and lower edges of each of which are provided with spaced teeth or projections which may be in the form shown in FIGS. 12 or 14. As shown, the upper and lower edges of the core strips are each provided with spaced projections 39 which are alternately bevelled in opposite directions relative to each other as shown in FIG. 15 and to support the core strips in place during assembly, each of the core strips is provided with spaced slots 71 to receive the upper portion of a supporting strip 72, and each of the supporting strips are in turn provided with lower spaced slots 73 through which a portion of each of the core strips 70 extend as shown in FIG. 32.

In preparing the panel, the assembly consisting of the core strips 70 and the supporting strips 72 are assembled in place upon a lower plate or skin 74 with the teeth or projections of the core strips engaging the lower plate or skin and the upper plate or skin 75 is then assembled in place upon the upper teeth or projections and pressure is applied to the outer faces of the plates or skins by means of a press or by passing the panel between rollers as shown in FIG. 17 to force the teeth or projections upon the upper edges of the core strips into the upper plates or skins and to curl them within the metal of the upper plate as indicated by the numerals 76 and 77 in FIG. 33 to provide a strong mechanical bond between the upper teeth or projections of the core strips and the upper plate or skin and to force the lower teeth or projections on the core strips into the inner face of the lower plate or skin and to curl them within the metal of the lower plate to provide a strong mechanical bond between the core strips and the lower plate or skin.

Figures 28, 34:
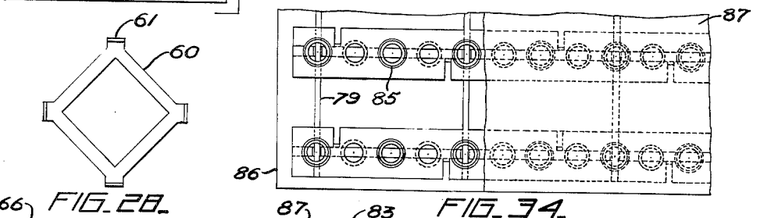
FIG. 34 is a plan view of another modification of my invention with parts of the upper plate broken away to show a plan view of another form of a fastening unit.

In the modification shown in FIGS. 30 to 32, the core strips are formed of a metal that is harder than the outer plates or skins. For instance, if the outer plates or skins are formed of aluminum, the core strips may be formed of a ferrous metal, such as iron. In accordance with my invention, however, I may provide a strong mechanical bond between the core strips and the outer plates or skins even when the outer skins or plates are formed of the same metal as the core strips or of a metal that is harder or softer than the core strips. This form of the invention is shown in FIGS. 34 to 36 of the drawings in which the core material is in the form of strips 78 which are held in place during assembly by supporting strips 79 in the same manner as shown in FIG. 32, that is by providing spaced upper slots 80 in the core strips to receive an upper portion of each of the supporting strips and the supporting strips in turn are provided with spaced slots 81 to receive the bottom portion of the core strips. In this modification, the core strips 78 have smooth upper and lower edges and upper and lower fastening units are provided, each consisting of inner and outer flat bars 82 and 83, and to enable the fastening units to be assembled upon the core strips, the outer bar is provided with spaced slits extending inwardly from alternate edges to provide spaced guide prongs 84 which extend through slots formed on the inner bar and engage the opposite sides of the core strips as shown in FIGS. 34 and 35. The inner and outer bars of each fastening unit are provided with spaced apertures and projections which are preferably arranged in alternate relation to each other and the projections on the inner bar extend through the apertures in the outer bar and the projections on the outer bar extend through the apertures in the inner bar and each of the projections has a bevelled edge as indicated by the numeral 85 in FIGS. 34 and 36.

After the fastening units are assembled on the upper and lower edges of the core strips, the assembly is placed upon the lower plate or skin 86 with the projections on the inner bar of the lower fastening units engaging plate 86. The upper plate or skin 87 is then placed upon the projections extending from the inner bar of the upper fastening units and the assembly is subjected to pressure or passed between rollers under pressure to force the projections of the inner member of each fastening unit into the outer skins or plates and to curl the bevelled projections into the metal of the plates and simultaneously the inwardly extending projections on the outer bar of each of the fastening units is forced into the opposite edges of the core strips and are curled within the metal of the core strips to form a strong mechanical bond between the outer bars and the core.

When the outer plates or skins are composed of the same metal as that of the core material, or even when they are formed of different metals, each of which is softer than the metal of the fastening unit, it is not essential that the fastening units shall be formed of a pair of members. This form of my invention is shown in FIGS. 37 to 40 of the drawings in which the fastening unit consists of a resilient bar 88 having spaced apertures therein which are defined by the metal forming the outwardly and inwardly bevelled projections 89 and 90 and to facilitate bending of the metal of the bar during assembly of the panel, the bar is provided with substantially rectangular slots 91, each of which is arranged between the oppositely extending projections. The bar is also provided with pairs of spaced prongs 92 which engage the opposite sides of the core strips 93 when one of the fastening units is placed upon the upper edge of a core strip and a similar fastening unit is placed upon the lower edge of a core strip and to maintain the core strips in place during assembly, supporting strips 94 are provided, the upper portion of each of which extends through slots in the core strips and the supporting members in turn are provided with lower slots through which the core strips extend as shown more particularly in FIGS. 32 and 36.

The core strips with the fastening units in place are then placed upon a lower plate or skin 95 with the lower fastening unit engaging the lower plate and the upper plate or skin 96 is placed over the upper bar and when pressure is applied to the assembly, the outwardly bevelled projections 89 of the upper and lower fastening units are forced into the respective plates 95 and 96 of the panel and are curled within the metal forming the plates as indicated by the numeral 97 and the inwardly extending bevelled projections 90 of the upper and lower fastening units are forced into the upper and lower edge portions of the core material and are curled therein as indicated by the numeral 98 to form a strong mechanical bond between each of the fastening units and the plates and the core metal.

In all of the modifications, it will be noted that no brazing or welding is required and consequently a finishing material, if desired, may be applied to one or both of the outer plates or skins prior to the assembling operation in the same manner as shown and described with respect to the modification shown in FIGS. 1 to 4. When the core material is tubular, insulation may be blown around the tubular cores and this is also true when core strips are utilized as shown in FIG. 30. Insulation may also be placed between the core strips and the supporting strips prior to the assembly of the upper plate or skin as shown in FIGS. 32 to 40.

What is claimed is:

1. A panel including first and second thin metal sheets arranged in opposed relation to each other, a core including a plurality of spaced metal members, each of which includes a body portion arranged between the sheets which body portions are perpendicular to the sheets and are of sufficient height to maintain the sheets in spaced relation to each other and each of said core members being provided with upper and lower narrow edge portions which are substantially coextensive with the body portion and which consists of a comparatively large number of short spaced projections in which some of the projections in the upper edge portion of each core member are each tapered in one direction from the body portion to its other edge and the remainder of the projections in the upper edge of each core member are each tapered in the opposite direction from its body portion to its other edge and in which the upper penetrating edge of each of said projections is of less thickness than but is of substantially the same width as its base portion and in which each of the tapered projections in the upper edge of each core member extends a short distance into the metal of the first sheet and is angularly embedded within the metal of the first sheet inwardly of the outer face of the first sheet in the direction its face is tapered to provide a strong mechanical connection between the core members and the first sheet and in which each of some of the projections in the lower edge of each core member each has a face tapered in one direction from its body portion toward its other edge and the remainder of the projections in the lower edge portion of each core member has a face tapered in the opposite direction from its body portion to its other edge to provide penetrating edge portions, each of which is of less thickness than but is of substantially the same width as its base portion and in which each of the tapered projections in the lower edge portion of each core member extends a short distance into the metal of the second sheet and is angularly embedded within the metal of the second sheet inwardly of the outer face of the second sheet and in the direction its face is tapered to provide a strong mechanical connection between the core members and the second sheet.

2. A panel including first and second metal sheets arranged in opposed relation to each other, a core including a plurality of spaced metal members, each of which includes a body portion arranged between the sheets which body portions are perpendicular to the sheets and are of sufficient height to maintain the sheets in spaced relation to each other and each of said core members being provided with upper and lower narrow edge portions which are substantially coextensive with the body portion and which consist of a comparatively large number of short projections of substantially the same height which are separated by narrow slots of substantially less width than the projections and in which some of the projections in the upper edge portion of each core member are each tapered in one direction from the body portion to its other edge and the remainder of the projections in the upper edge portion of each core member are each tapered in the opposite direction from the body portion to its opposite edge to provide penetrating edges which are of less thickness than but which are of substantially the same width as its base portion and each of which projections extends a short distance into the metal of the first sheet and is angularly embedded within the metal of the first sheet in spaced relation to the outer face of the first sheet in the direction its face is tapered to provide a substantially continuous mechanical connection between the core members and the first sheet and in which some of the projections in the lower edge portion of each of the core members has a face tapered in one direction from its body portion to its opposite edge and the remainder of the projections in the lower edge portion of each of the core members are each tapered in the opposite direction from its body portion to its other edge to provide lower penetrating edge portions, each of which is of less thickness than but is of the same width as its base portion and each of which lower projections extends a short distance into the metal of the second sheet and is angularly embedded within the metal of the second sheet inwardly from the outer face of the second sheet and in the direction its face is tapered to provide a substantially continuous connection between the core members and the second sheet.

3. A panel including first and second metal sheets arranged in opposed relation to each other, a core including a plurality of spaced metal members, each of which includes a body portion arranged between the sheets which body portions are perpendicular to the sheets and are of sufficient height to maintain the sheets in spaced relation to each other and each of said core members being provided with upper and lower narrow edge portions which are substantially coextensive with the body portion and each of which consists of a comparatively large number of short projections separated by narrow slots of substantially less width than the projections and in which alternate projections in the upper edge portion of each core member are each tapered in one direction from its body portion to its other edge and the other alternate projections are each tapered in the opposite direction from its body portion to its opposite edge to provide penetrating edge portions in which the outer edge of each projection is of less thickness than but is of substantially the same width as its base portion and each of which upper projections extends a short distance into the metal of the first sheet and is angularly embedded within the metal of the first sheet inwardly of the outer face of the first sheet in the direction its face is tapered to provide a substantially continuous connection between the core members and the first sheet and in which alternate projections in the lower edge portions of each core member each has a face tapered in one direction from its body portion to its other edge and the other alternate projections are each tapered in the opposite direction from its body portion to its other edge to provide penetrating edge portions in which the outer edge of each projection is of the same width as its base portion and each of which lower projections extends a short distance into the metal of the second sheet and is angularly embedded within the metal of the second sheet inwardly of the outer face of the second sheet and in the direction its face is tapered to provide a substantially continuous connection between the core members and the second sheet.

4. A panel as defined in claim 3 in which each of the core members are substantially tubular in shape.

5. The process of preparing panels which comprises interposing between oppositely disposed thin metal sheets a plurality of spaced metal core members, each of which has a body portion of sufficient height to maintain the sheets in spaced relation to each other and each of said core members having upper and lower edge portions which is harder than the metal of the sheets and which is composed of a comparatively large number of spaced projections which are substantially coextensive with the body portion and in which each of the projections has one face which extends normal to the sheets and some of the projections on each edge portion of each core member are each tapered in one direction from the body portion to its normally extending face and the remainder of which are each tapered from the body portion in the oposite direction to its normally extending face to provide penetrating edge portions, the outer edge of each of which projections is of less thickness than but is of susbtantially the same width as its base portion, and applying only a sufficient pressure to the opposite faces of said sheets to force the projections on the uper edge of each of said core members a short distance into the metal of the first sheet and the projections on the lower edge of each of said core members a short distance into the metal of the second sheet and continuing the application of pressure to the outer faces of said sheets to move the sheets toward each other and to cause the metal of the first sheet to angularly embed each of the tapered projections constituting the upper edge of each of the core members within the metal of the first sheet inwardly of the outer face of the first sheet and in a direction corresponding to the direction its face is tapered to provide a strong mechanical connection between the core members and the first sheet and to cause the second metal sheet to angularly embed each of the tapered projections constituting the lower edge portion of each of the core members within the metal of the second sheet and in a direction corresponding to the direction its face is tapered to provide a strong mechanical connection between the core members and the second sheet.

6. The process as defined in claim 5 in which each of the core members consists of strips having arcuate-shaped portions.

7. The process as defined in claim 5 in which the core members are substantially tubular in shape.

8. The process of preparing panels which comprises interposing between oppositely disposed thin metal sheets a plurality of spaced metal core members, each having a body portion of sufficient height to maintain the sheets in spaced relation to each other and each of said core members having upper and lower edge portions which are composed of a comparatively large number of projections which are spaced from each other by narrow slots of substantially less width than the projections and in which each of the projections on each core member has one face which extends normal to the sheets and in which alternate projections are each tapered from the body portion to its normally extending face and the remainder of the alternate projections are each tapered from the body portion in the opposite direction to its normally extending face to provide penetrating edge portions, the outer penetrating edge of each of which projections is of less thickness than but is of substantially the same width as its base portion, and applying only sufficient pressure to the opposite faces of said sheets to force the tapered projections on the upper edge of each of said core members a short distance into the metal of the first sheet and the tapered projections on the lower edge of each of said core members a short distance into the metal of the second sheet and continuing the application of pressure to the outer faces of said sheets to move said sheets a sufficient distance toward each other to cause the metal of the first sheet to angularly embed each of the tapered projections constituting the upper edge of each of the core members within the metal of the first sheet inwardly of the outer face of the first sheet and in a direction corresponding to the direction its face is tapered to provide a substantially continuous connection between the core members and the first sheet and to cause the second metal sheet to angularly embed each of the tapered projections in the lower edge portion of each of the core members within the metal of the second sheet inwardly of the outer face of the second sheet and in a direction corresponding to the direction its face is tapered to provide a substantially continuous mechanical connection between the core members and the second sheet.

References Cited in the file of this patent

UNITED STATES PATENTS

| | | |
|---|---|---|
| 1,675,387 | Simonds et al. | July 3, 1928 |
| 1,734,410 | Wells | Nov. 5, 1929 |
| 2,051,373 | Fitzgerald | Aug. 18, 1936 |
| 2,056,563 | Budd et al. | Oct. 6, 1936 |
| 2,084,544 | Wilson | June 22, 1937 |
| 2,165,846 | Gaisman | July 11, 1939 |
| 2,327,265 | Herr | Aug. 17, 1943 |
| 2,486,769 | Watson | Nov. 1, 1949 |
| 2,752,672 | Tolman | July 3, 1956 |
| 2,775,028 | Wampler | Dec. 25, 1956 |
| 2,805,739 | Dennison | Sept. 10, 1957 |

FOREIGN PATENTS

| | | |
|---|---|---|
| 769,663 | France | June 11, 1934 |
| 490,541 | Canada | Feb. 17, 1953 |